(12) United States Patent
Yoon (10) Patent No.: US 12,189,914 B2
(45) Date of Patent: Jan. 7, 2025

(54) USER INTERFACE DISPLAY METHOD AND APPARATUS THEREFOR

(71) Applicant: Samsung Electronics Co., Ltd., Suwon-si (KR)

(72) Inventor: Sung-Jin Yoon, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 18/432,752

(22) Filed: Feb. 5, 2024

(65) Prior Publication Data

US 2024/0176457 A1  May 30, 2024

Related U.S. Application Data

(63) Continuation of application No. 17/358,756, filed on Jun. 25, 2021, now Pat. No. 11,893,200, which is a continuation of application No. 16/925,859, filed on Jul. 10, 2020, now Pat. No. 11,048,373, which is a continuation of application No. 14/781,470, filed as
(Continued)

(30) Foreign Application Priority Data

Apr. 1, 2013 (KR) .................. 10-2013-0035358

(51) Int. Cl.
| | |
|---|---|
| G06F 3/0481 | (2022.01) |
| G06F 3/0482 | (2013.01) |
| G06F 3/04842 | (2022.01) |
| G06F 3/04847 | (2022.01) |
| G06F 3/0488 | (2022.01) |
| G06F 3/04883 | (2022.01) |

(52) U.S. Cl.
CPC .......... G06F 3/0481 (2013.01); G06F 3/0482 (2013.01); G06F 3/04842 (2013.01); G06F 3/04847 (2013.01); G06F 3/0488 (2013.01); G06F 3/04883 (2013.01); G09G 2354/00 (2013.01)

(58) Field of Classification Search
CPC .. G06F 3/0481; G06F 3/0488; G06F 3/04847; G06F 3/0482; G06F 3/04842; G06F 3/04883; G09G 2354/00
See application file for complete search history.

(56) References Cited

U.S. PATENT DOCUMENTS

| | | | |
|---|---|---|---|
| 5,559,301 A | 9/1996 | Bryan, Jr. et al. | |
| 5,933,141 A | 8/1999 | Smith | |

(Continued)

FOREIGN PATENT DOCUMENTS

| | | | |
|---|---|---|---|
| CN | 1856054 A | 11/2006 | |
| CN | 1976408 A | 6/2007 | |

(Continued)

OTHER PUBLICATIONS

Techsmith; Snagit on Windows 11; Snagit 11.1 Help File; Version 11.1.0; Oct. 2012.
(Continued)

*Primary Examiner* — Andrey Belousov
(74) *Attorney, Agent, or Firm* — Jefferson IP Law, LLP (57) ABSTRACT

A user interface (UI) display method is provided. The UI display method includes displaying an operation window including one or more setting items on a screen, and if a first one of the setting items is inputted, causing at least a part or all of the remaining operation window part except for the first item not to be displayed on the screen.

11 Claims, 10 Drawing Sheets

Related U.S. Application Data application No. PCT/KR2014/002647 on Mar. 28, 2014, now abandoned.

(56) References Cited

U.S. PATENT DOCUMENTS

| | | |
|---|---|---|
| 6,031,529 A | 2/2000 | Migos et al. |
| 6,661,437 B1 | 12/2003 | Miller et al. |
| 6,982,695 B1 | 1/2006 | Canova, Jr. et al. |
| 2003/0202019 A1 | 10/2003 | Detweiler et al. |
| 2004/0218104 A1 | 11/2004 | Smith et al. |
| 2005/0049006 A1 | 3/2005 | Lee |
| 2008/0174564 A1 | 7/2008 | Kim et al. |
| 2008/0195663 A1 | 8/2008 | Sekine |
| 2008/0199144 A1 | 8/2008 | Hailey et al. |
| 2008/0207188 A1 | 8/2008 | Ahn et al. |
| 2010/0211904 A1 | 8/2010 | Yun et al. |
| 2010/0281374 A1 | 11/2010 | Schulz et al. |
| 2011/0271222 A1 | 11/2011 | Cho |
| 2012/0072867 A1 | 3/2012 | Schlegel |
| 2014/0380234 A1 | 12/2014 | Shim et al. |
| 2015/0095853 A1 | 4/2015 | Hoerentrup et al. |

FOREIGN PATENT DOCUMENTS

| | | |
|---|---|---|
| CN | 100366084 C | 1/2008 |
| CN | 101226444 A | 7/2008 |
| CN | 101247454 A | 8/2008 |
| CN | 101252746 A | 8/2008 |
| CN | 101989295 A | 3/2011 |
| CN | 102404524 A | 4/2012 |
| CN | 102449589 A | 5/2012 |
| EP | 1 962 480 A2 | 8/2008 |
| KR | 10-2005-0023115 A | 3/2005 |
| KR | 10-2010-0094754 A | 8/2010 |
| KR | 10-2011-0121926 A | 11/2011 |
| KR | 10-2012-0011086 A | 2/2012 |
| KR | 10-2012-0064122 A | 6/2012 |
| WO | 99/35560 A1 | 7/1999 |

OTHER PUBLICATIONS

European Summons to Attend Oral Proceedings dated Jul. 15, 2019, issued in European Application No. 14779045.5.
Chinese Office Action dated Jul. 27, 2021, issued in Chinese Patent Application No. 201811633170.8.
Chinese Office Action dated Aug. 4, 2021, issued in Chinese Patent Application No. 201811631734.4.
Extended European Search Report dated Sep. 19, 2023, issued in European Patent Application No. 23177268.2.
European Office Action dated Apr. 4, 2024, issued in European Patent Application No. 23 177 268.2.

USER INTERFACE DISPLAY METHOD AND APPARATUS THEREFOR

CROSS-REFERENCE TO RELATED APPLICATION(S)

This application is a continuation application of prior application Ser. No. 17/358,756, filed on Jun. 25, 2021, which application is a continuation application of prior application Ser. No. 16/925,859, filed on Jul. 10, 2020, which has issued as U.S. Pat. No. 11,048,373 on Jun. 29, 2021, which is a continuation application of prior application Ser. No. 14/781,470, filed on Sep. 30, 2015, which is a U.S. National Stage application under 35 U.S.C. § 371 of an International application filed on Mar. 28, 2014, and assigned application number PCT/KR2014/002647, which is based on and claims priority under 35 U.S.C. § 119(a) of a Korean patent application number 10-2013-0035358, filed on Apr. 1, 2013, in the Korean Intellectual Property Office, the disclosure of which is incorporated by reference herein in its entirety.

TECHNICAL FIELD

The present disclosure relates to a screen display technique. More particularly, the present disclosure relates to a user interface (UI) display method and apparatus.

BACKGROUND

Recently, with the rapid development of electronic technologies, functions of electronic devices, such as computers, laptop computers, tablet personal computers (PCs), navigation systems, smartphones, cellular phones, and so forth, have been diversified, and the currently released electronic devices offer various user interfaces (UIs) for user convenience. A UI may perform prompt and intuitive information delivery through simple manipulation. Thus, to allow users to conveniently use electronic devices, UI-related techniques have been actively developed.

Among UI techniques of the related art, a UI display-related technique includes displaying a manipulation unit on an entire screen or a partial screen once a user pops up the manipulation unit necessary for a work environment.

In addition, Korean Patent Publication No. 2010-0041444 (Title: Method and Apparatus for Displaying Transparent Pop-up Including Additional Information Corresponding to Information Selected on Touchscreen, Inventor: Tae-Kyun Cho, Applicant: Samsung Electronics Co., Ltd., Publication Date: Nov. 9, 2011) is a technique related to UI display according to the related art, which discloses a technique for displaying a transparent pop-up including additional information corresponding to information located in the same area as the displayed pop-up without closing the displayed pop-up.

Figure 1A:
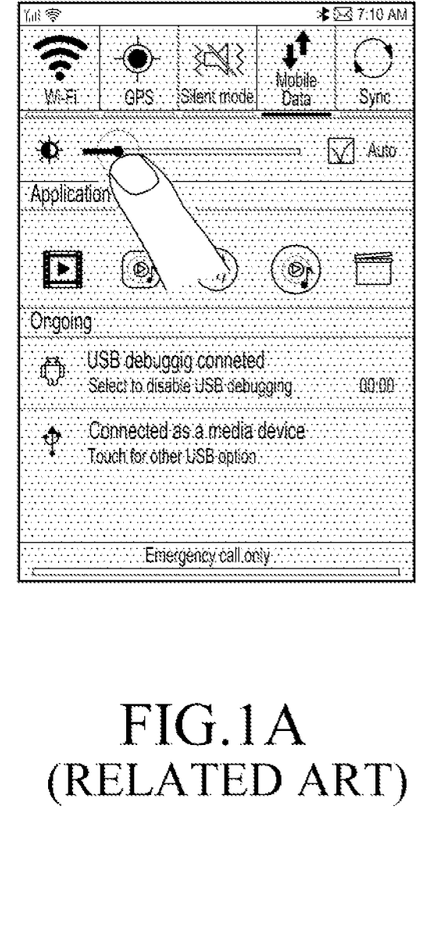
FIGS. 1A and 1B illustrate user interface (UI) display operations according to the related art.
Figure 1B:
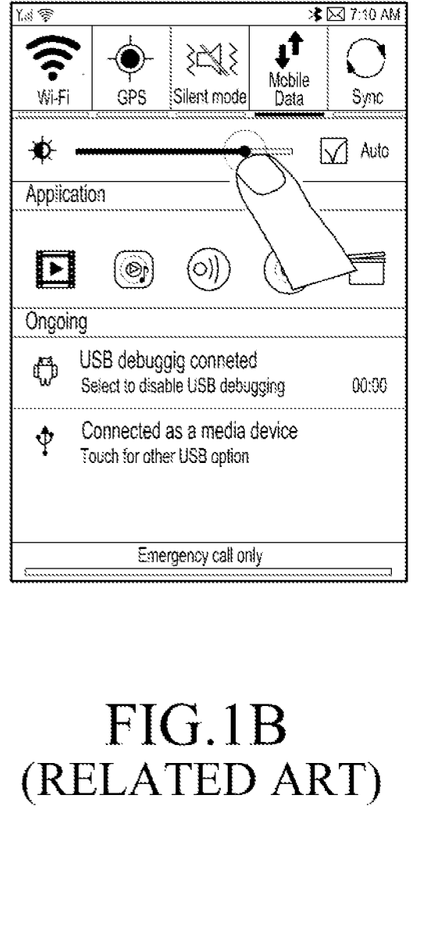
Figure 2:
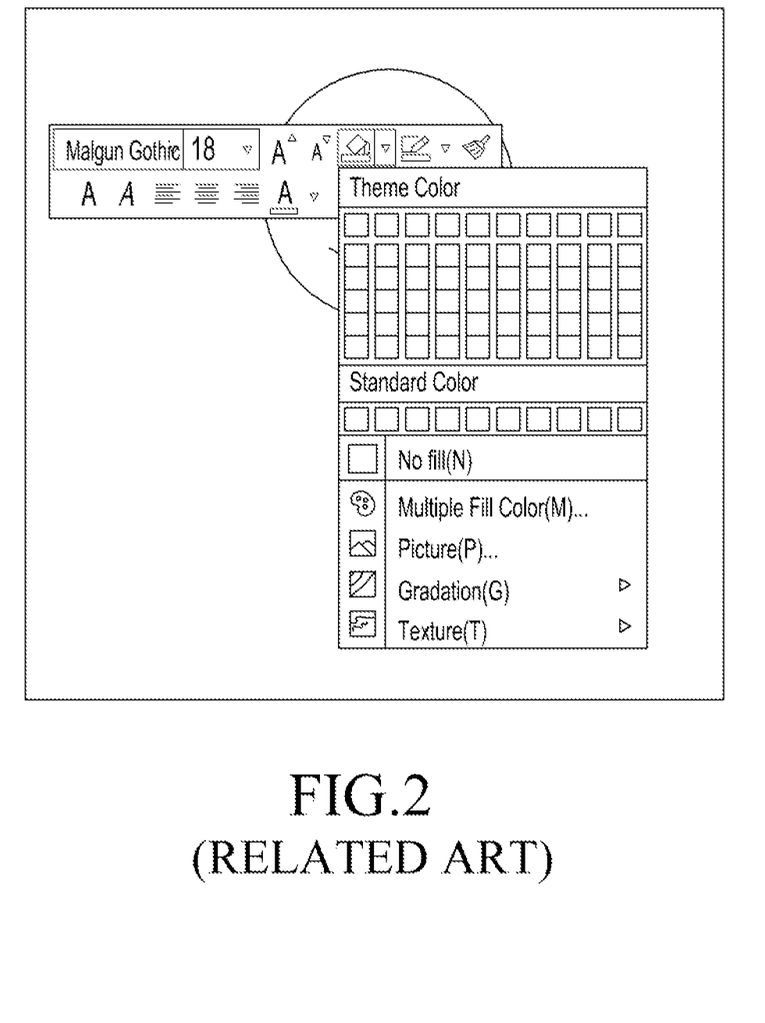
FIG. 2 illustrates a UI display operation according to the related art.

FIGS. 1A and 1B illustrate UI display operations according to the related art and FIG. 2 illustrates a UI display operation according to the related art.

Referring to FIGS. 1A, 1B and 2, a UI display technique of the related art provides a screen for manipulation by a user as an entire screen or a partial screen, and the user has to close or move the provided manipulation screen to check data below the manipulation screen. For example, if the user desires to manipulate a brightness of a screen by pulling down a notification bar on the home screen as shown in FIGS. 1A and 1B, the user may not check the home screen having the actually set brightness and thus may have to adjust the brightness again. Also, as shown in FIG. 2, if a pop-up menu is generated to change attributes of a square, the square is entirely or partially occluded, such that an additional operation of moving the pop-up menu is needed to check if a desired color is correctly reflected.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a user interface (UI) display method and apparatus for minimizing a part occluded by an operation window when a user pops up the operation window on a screen. Thus, when the user pops up a window for an additional operation on a work screen, the user may perform a desired operation without taking additional trouble to move the additional operation window and may immediately check the screen to which the operation is reflected.

In accordance with an aspect of the present disclosure, a UI display method is provided. The UI display method includes displaying an operation window including one or more setting items on a screen and, if an input is generated on a first item among the one or more setting items of the operation window displayed on the screen, causing at least a part or all of a remaining part of the operation window except for the first item not to be displayed on the screen.

In accordance with another aspect of the present disclosure, a UI display apparatus is provided. The UI display apparatus includes an input unit configured to receive a user's operation, a display unit configured to display an execution image and an operation state and a menu state of an application, and a controller configured to display an operation window including one or more setting items on the display unit, and if an input is generated on a first item among the one or more setting items of the operation window displayed on the display unit according to an input through the input unit, to control at least a part or all of a remaining part of the operation window except for the first item not to be displayed on the display unit.

As described above, by using a UI display method and apparatus according to the present disclosure, when a user pops up a screen for an operation on a screen, a part occluded by the operation screen may be minimized. Thus, an additional operation of the user, such as moving a popup menu to prevent the popup menu from occluding a picture below the popup menu, may not be necessary. Moreover, an operation and a screen to which the operation is actually applied may be immediately checked.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which.

Throughout the drawings, it should be noted that like reference numbers are used to depict the same or similar elements, features, and structures.

DETAILED DESCRIPTION

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 3:
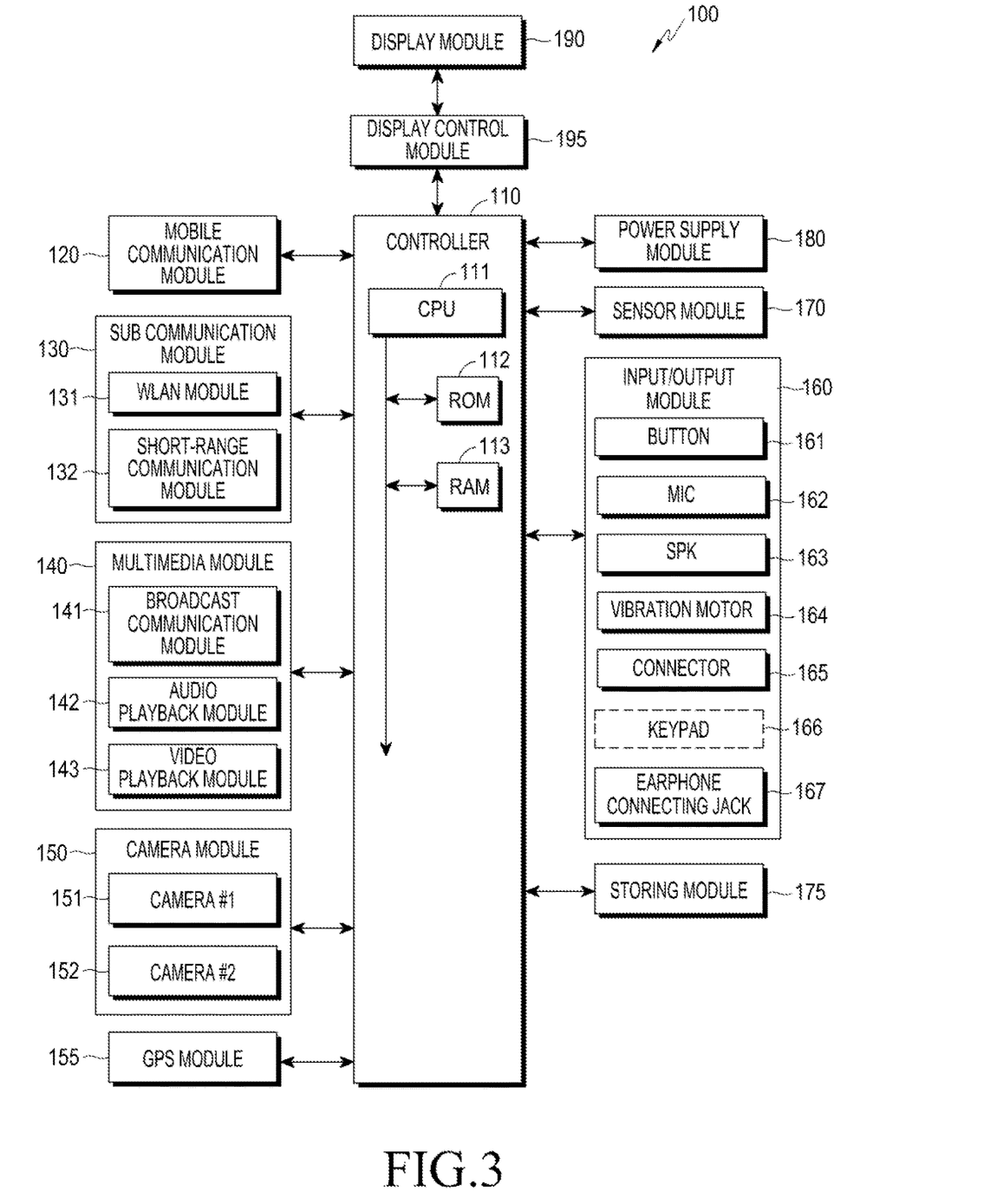
FIG. 3 is a block diagram of a portable terminal device for performing a UI display operation according to an embodiment of the present disclosure.

FIG. 3 is a block diagram of a portable terminal device for performing a user interface (UI) display operation according to an embodiment of the present disclosure.

Referring to FIG. 3, a portable terminal device 100 may include a controller 110, a mobile communication module 120, the sub communication module 130, a multimedia module 140, a camera module 150, a global positioning system (GPS) module 155, an input/output module 160, a sensor module 170, a storing module 175, a power supply module 180, a display module 190, and a display control module 195.

The sub communication module 130 includes at least one of a wireless local area network (WLAN) module 131 and a short-range communication module 132. The multimedia module 140 includes at least one of a broadcast communication module 141, an audio playback module 142 and a video playback module 143. The camera module 150 includes at least one of a first camera 151 and a second camera 152. The input/output module (also called an input/output unit) 160 includes at least one of a button 161, a microphone 162, a speaker 163, a vibration motor 164, a connector 165, a keypad 166, and an earphone connecting jack 167. The following description will be made based on an example that the display module 190 and the display control module 195 are a touchscreen and a touchscreen controller, respectively.

The power supply module 180 supplies power to one or more batteries (not shown) disposed in a housing of the portable terminal device 100 under control of the controller 110. The one or more batteries supply power to the portable terminal device 100. The power supply module 180 may also supply power input from an external power source (not shown) through a wired cable connected with the connector 165 to the portable terminal device 100. The power supply module 180 may also supply power, which is wirelessly input from an external power source using a wireless charging technique, to the portable terminal device 100.

The camera module 150 may include at least one of the first camera 151 and the second camera 152 which capture a still image or a video under control of the controller 110.

The multimedia module 140 may include the broadcast communication module 141, the audio playback module 142, or the video playback module 143. The broadcast communication module 141 receives a broadcast signal (for example, a television (TV) broadcast signal, a radio broadcast signal, or a data broadcast signal) and broadcast additional information (for example, an electric program guide (EPG) or an electric service guide (ESG)) transmitted from a broadcasting station (not shown) via a broadcast communication antenna (not shown) under control of the controller 110. The audio playback module 142 may play a digital audio file (for example, a file having a file extension such as 'mp3', 'wma', 'ogg', or 'wav') stored or received under control of the controller 110. The video playback module 143 may play a digital video file (for example, a file having a file extension such as 'mpeg', 'mpg', 'mp4', 'avi', 'mov', or 'mkv') stored or received under control of the controller 110. The video playback module 143 may play a digital audio file.

The multimedia module 140 may include the audio playback module 142 and the video playback module 143, except for the broadcast communication module 141. Also, the audio playback module 142 and/or the video playback module 143 of the multimedia module 140 may be included in the controller 110.

The mobile communication module 120 may facilitate the connection between the portable terminal device 100 and an external device through mobile communication by using at least one or plural antennas (not shown) under control of the controller 110. The mobile communication module 120 transmits/receives a wireless signal for a voice call, a video call, a text message (i.e., a short messaging service (SMS)), and/or a multimedia message (i.e., a multimedia messaging service (MMS)) with a cellular phone (not shown), a smart phone (not shown), a tablet personal computer (PC), or another device (not shown) which has a phone number input into the portable terminal device 100. The mobile communication module 120 is connected with the wireless Internet or wirelessly transmits/receives a wireless signal to/from nearby devices in a space where an access point (AP) is installed through wireless fidelity (Wi-Fi) or a third generation (3G)/fourth generation (4G) data network, under control of the controller 110.

The sub communication module 130 may include at least one of the WLAN module 131 and the short-range communication module 132.

The WLAN module 131 may be connected to the Internet in a place where a wireless AP (not shown) is installed, under control of the controller 110. The WLAN module 131 supports the Institute of Electrical and Electronics Engineers (IEEE) wireless LAN standard 802.11x. The short-range communication module 132 may wirelessly perform short-range communication between the portable terminal devices 100 under control of the controller 110.

The portable terminal device 100 may include at least one of the mobile communication module 120, the WLAN module 131, and the short-range communication module 132, depending on its capability. For example, the portable terminal device 100 may include a combination of the mobile communication module 120, the WLAN module 131, and the short-range communication module 132 depending on its capability.

The GPS module 155 receives signals from a plurality of GPS satellites (not shown) that orbit the Earth and calculates a position of the portable terminal device 100 using time of arrival from the GPS satellite (not shown) to the portable terminal device 100.

The sensor module 170 includes at least one sensor for detecting a state of the portable terminal device 100. For example, the sensor module 170 may include at least one of a proximity sensor for detecting the user's proximity with respect to the portable terminal device 100, a motion sensor (not shown) for detecting an operation of the portable terminal device 100 (for example, rotation, acceleration, deceleration, vibration, etc. of the portable terminal device 100), an illumination sensor (not shown) for detecting an amount of light around the portable terminal device 100, a gravity sensor for detecting a working direction of gravity, and an altimeter for measuring an atmospheric pressure to detect an altitude. The sensor module 170 may also include a geo-magnetic sensor (not shown) for detecting a point of the compass by using the Earth's magnetic field, and an inertial sensor for measuring an angular displacement in a predetermined direction or a variation rate thereof.

The sensor of the sensor module 170 may be added or removed depending on the capability of the portable terminal device 100. The sensor module 170 detects a state of the portable terminal device 100 and generates a signal corresponding to the detection to output the signal to the controller 110.

The input/output module 160 (also called an input/output unit) may include the at least one button 161, the microphone 162, the speaker 163, the vibration element 164, the connector 165, and the keypad 166.

The at least one button 161 may be formed on at least one of a front surface, a side surface, and a rear surface of the housing of the portable terminal device 100, and may include at least one of a power/lock button (not shown), a volume button (not shown), a menu button, a home button, a back button, and a search button.

The microphone 162 receives a voice or sound and generates a corresponding electric signal under control of the controller 110.

The speaker 163 may include a plurality of speakers and be formed in one or more positions of the portable terminal device 100. The speaker 163 outputs a sound corresponding to various signals (for example, wireless data, broadcast data, a digital audio file, a digital video file, a picture, or the like) of the mobile communication module 120, the sub communication module 130, the multimedia module 140, or the camera module 150 under control of the controller 110. The speaker 163 may output sound corresponding to a function executed by the portable terminal device 100 (for example, button manipulation sound corresponding to a phone call, or a ring back tone).

The vibration motor 164 converts an electric signal into mechanical vibration under control of the controller 110. For example, in the portable terminal device 100, in a vibration mode, if a voice call from another device (not shown) is received, the vibration motor 164 operates. One or more of the vibration element 164 may be disposed in the housing of the portable terminal device 100. The vibration element 164 may operate in response to a user's touch action of touching the touch screen 190 and a continuous movement of a touch on the touch screen 190.

The connector 165 may be used as an interface for connecting the portable terminal device 100 with an external device (not shown) or a power source (not shown). Under control of the controller 110, the portable terminal device 100 transmits data stored in the storing module 175 of the portable terminal device 100 to an external device (not shown) or receives data from the external device through a wired cable connected to the connector 165. The portable terminal device 100 receives power from the power source (not shown) through the wired cable connected to the connector 165 or charges a battery (not shown) by using the power source.

The keypad 166 receives key input from the user for control of the portable terminal device 100. The keypad 166 includes a physical keypad (not shown) formed in the portable terminal device 100 or a virtual keypad (not shown) displayed on the touch screen 190. The physical keypad (not shown) formed in the portable terminal device 100 may be excluded according to the capability or structure of the portable terminal device 100.

An earphone (not shown) may be inserted into the earphone connecting jack 167 to be connected to the portable terminal device 100.

The touch screen 190 receives a user's manipulation and displays an execution image of an application program and an operation state and a menu state. That is, the touch screen 190 provides a UI corresponding to various services (for example, call, data transmission, broadcasting, picture taking) to the user. The touch screen 190 transmits an analog signal corresponding to at least one touch input into the UI to the touch screen controller 195. The touch screen 190 receives at least one touch input through a user's body (for example, a finger including a thumb) or a touchable input means (for example, a stylus pen). The touch screen 190 receives a continuous movement of at least one touch. The touch screen 190 delivers an analog signal corresponding to the received continuous movement of the touch to the touch screen controller 195.

In an embodiment of the present disclosure, a touch is not limited to a direct contact between the touch screen 190 and a user's body or a touchable input means, and may also include a non-contact touch. A detectable interval from the touch screen 190 may be changed according to the capability or structure of the portable terminal device 100. For example, to separately detect a direct touch event based on a contact with the user input means and non-contact touch event (for example, a hovering event), the touch screen 190 may be configured to output different values (for example, current values) for the touch event and for the hovering event. The touch screen 190 may preferably output different detected values (for example, current values) according to a distance between a space where the hovering event occurs and the touch screen 190.

The touch screen 190 may be implemented, for example, as a resistive type, a capacitive type, an electro-magnetic resonance (EMR) type, an infrared type, or an acoustic wave type.

The touch screen controller 195 converts an analog signal received from the touch screen 190 to a digital signal (for example, X and Y coordinates) and delivers the digital signal to the controller 110. The controller 110 may control the touch screen 190 using the digital signal received from the touch screen controller 195. For example, the controller 110 may control selection or execution of a shortcut icon (or an application corresponding thereto) displayed on the touch screen 190 in response to a touch event or a hovering event. The touch screen controller 195 may be incorporated into the controller 110.

The touch screen controller 195 detects a value (for example, a current value) output through the touch screen 190, identifies a distance between the space where the hovering event occurs and the touch screen 190, converts the identified distance into a digital signal (for example, a Z coordinate), and provides the digital signal to the controller 110.

The touch screen 190 may include at least two touch panels capable of sensing a touch or proximity of the user's body and the touchable input means to simultaneously receive inputs by the user's body and the touchable input means. The at least two touch panels provide different output values to the touch screen controller 195. Thus, the touch screen controller 195 differently recognizes the values input from the at least two touch screen panels to identify whether the input from the touch screen 190 is the input generated by the user's body or the touchable input means.

The storing module 175 stores a signal or data which is input/output to/from the mobile communication module 120, the sub communication module 130, the multimedia module 140, the camera module 150, the GPS module 155, the input/output module 160, the sensor module 170, or the touch screen 190, under control of the controller 110. The storing module 175 may also store a control program and applications for control of the portable terminal device 100 and/or the controller 110.

The term "storing module" includes the storing module 175, a read only memory (ROM) 112 and a random access memory (RAM) 113 in the controller 110, or a memory card (not shown) mounted in the portable terminal device 100 (for example, a secure digital (SD) card, a memory stick). The storing module may include a non-volatile memory, a volatile memory, a hard disk drive (HDD), or a solid state drive (SSD).

The controller 110 includes a central processing unit (CPU) 111, the ROM 112 in which a control program for controlling the portable terminal device 100 is stored, and the RAM 113 which stores a signal or data input from the portable terminal device 100 or is used as a memory region for a task performed in the portable terminal device 100. The CPU 111 may include a single core, a dual core, a triple core, or a quad core processor. The CPU 111, the ROM 112, and the RAM 113 may be interconnected through an internal bus.

The controller 110 controls the mobile communication module 120, the sub communication module 130, the multimedia module 140, the camera module 150, the GPS module 155, the input/output module 160, the sensor module 170, the storing module 175, the power supply module 180, the touch screen 190, and the touch screen controller 195.

According to characteristics of a UI display operation of the present disclosure, the controller 110 may control at least a part or all of the remaining operation window part except for a first item on an operation window displayed on the touch screen 190 not to be displayed on the touch screen 190, if an input is generated onto the first item among one or more setting items of the operation window displayed on the touch screen 190 due to an input through the touch screen 190. If the input to the first item is ended after the controller 110 controls at least a part or all of the remaining operation window part except for the first item on the operation window displayed on the touch screen 190 not to be displayed on the touch screen 190, the controller 110 controls the at least a part or all of the remaining operation window part except for the first item on the operation window displayed on the touch screen 190 to be displayed on the touch screen 190 again.

Figure 4:
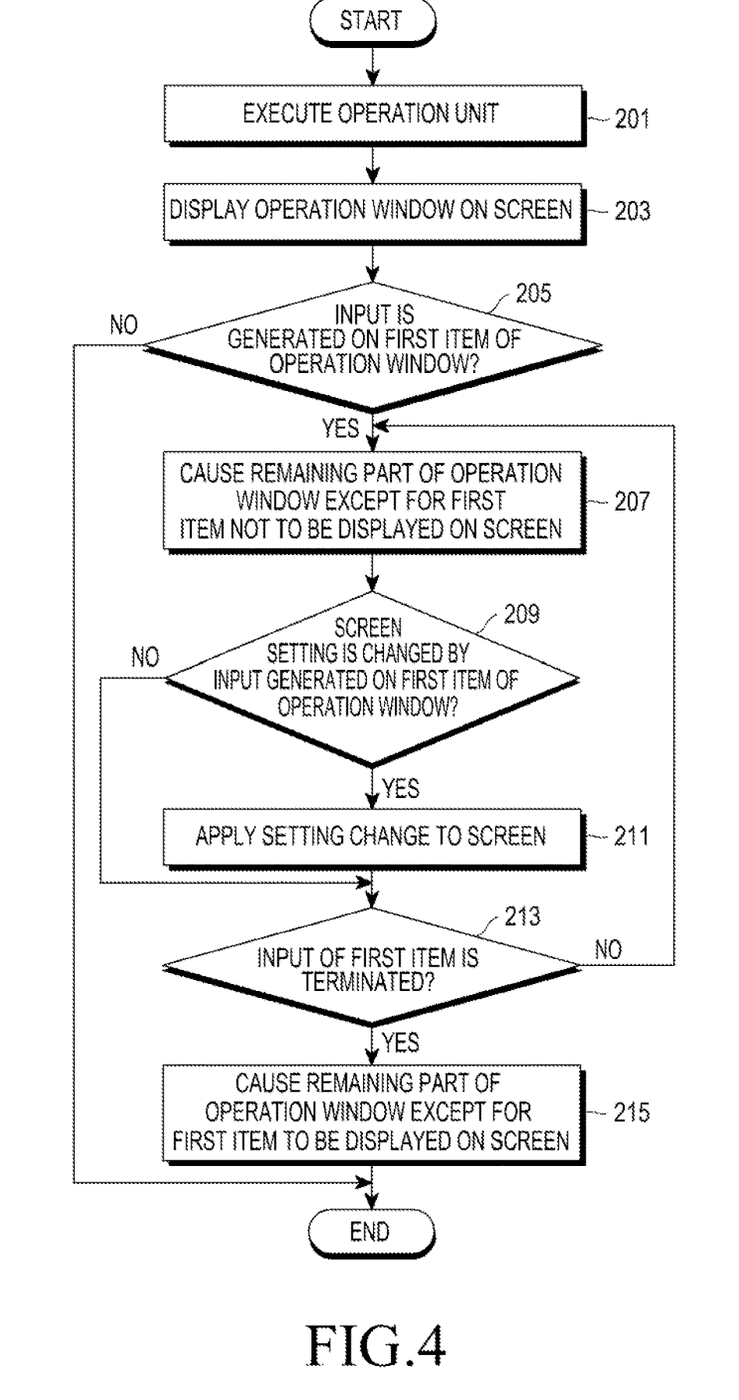
FIG. 4 is a flowchart of a UI display operation according to an embodiment of the present disclosure.

FIG. 4 is a flowchart of a UI display operation according to an embodiment of the present disclosure.

Referring to FIG. 4, if an input is generated in a part the user actually operates after an operation window is displayed on the screen, the remaining operation window part except for the part where the input is generated disappears from the screen. Moreover, if the user's input is terminated (if the focus is off for selection completion or another operation), an initially provided operation window is restored on the screen. Thus, the illustrated example provides the operation window the user may change and the screen onto which an operation is to be reflected at the same time.

In operation 201, an operation part is executed by a user's manipulation or operation such as a voice input, a touch, a pressing of a button, or the like, and in operation 203, a window of the executed operation is displayed on the screen. The operation part may be, for example, an environment setting or a notification bar of a portable terminal device, and the operation window may include one or more setting items. The setting items may include various items, for example, a screen brightness setting, a font size setting, a volume setting, and so forth. The window operation displayed on the screen may be displayed as the entire screen or a partial screen of the portable terminal device.

In operation 205, it is determined whether an input is generated on a first item among the one or more setting items of the operation window. The input may include a pressing of a button, a touch, a hovering input, a voice input, etc. to activate the first item.

If it is determined in operation 205 that the input is generated on the first item of the operation window, the process goes to operation 207. Otherwise, if it is determined that the input is not generated on the first item of the operation window, operations are terminated.

In operation 207, the remaining part of the operation window except for the operation window is caused not to be displayed on the screen. This is intended to display only the first item on the screen by changing a screen setting in such a way so as not to display the remaining part of the operation window except for the first item, if an input is generated in a part the user actually manipulates.

In operation 209, it is determined whether a screen setting has changed by the input generated on the first item of the operation window. If it is determined in operation 209 that the screen setting has changed by the input generated on the first item of the operation window, the process goes to operation 211. Otherwise, if it is determined in operation 209 that the screen setting has not changed by the input generated on the first item of the operation window, the process goes to operation 213. In operation 211, the setting change is applied to the screen.

In operation 213, it is determined whether the input of the first item is terminated. The input termination may correspond to a case where setting of the first item has completed by selection of an end button or a cancel button, or selection of a back button. The input termination may be input termination corresponding to the elapse of a preset time or generation of an input in a part other than the first item. If it is determined in operation 213 that the input of the first item is terminated, the process goes to operation 215, and if it is determined in operation 213 that the input of the first item is not terminated, the process goes back to operation 207.

In operation 215, the remaining part of the operation window except for the first item is caused to be displayed on the screen again. This operation restores the operation window.

FIGS. 5A to 5D illustrate UI displays corresponding to a hand touch according to an embodiment of the present disclosure.

Figure 5A:
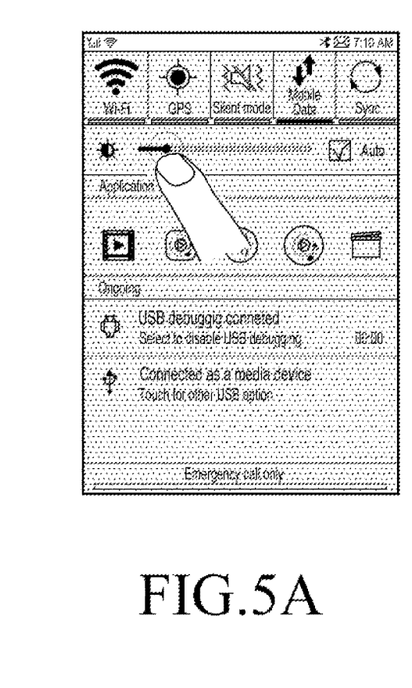
FIGS. 5A, 5B, 5C, and 5D illustrate UI displays corresponding to a hand touch according to an embodiment of the present disclosure.
Figure 5B:
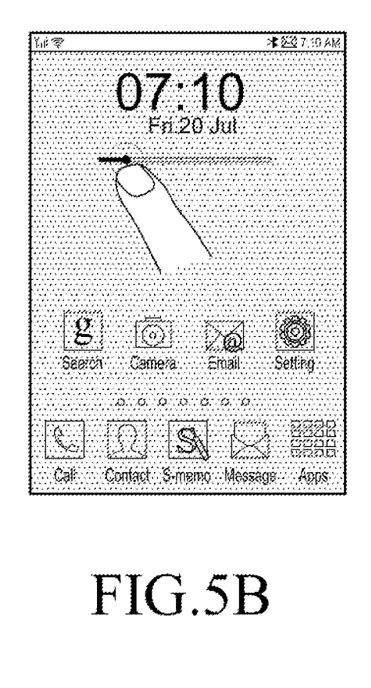
Figure 5C:
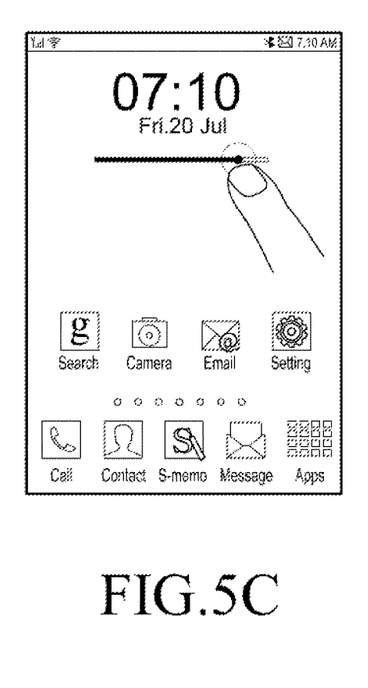
Figure 5D:
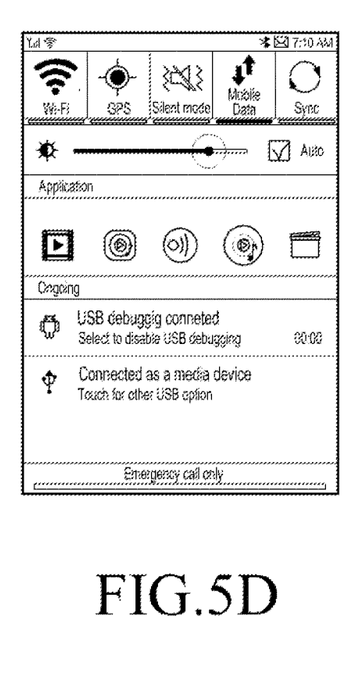

Referring to FIGS. 5A to 5D, when an operation window is displayed as the entire screen on a home screen, upon a touch input onto a scroll bar for adjusting screen brightness as shown in FIG. 5A, the remaining part of the operation window except for the scroll bar disappears from the screen as shown in FIG. 5B, displaying only the scroll bar on the home screen. In this state, if a point of the scroll bar is moved through the touch and/or the drag, the screen brightness is changed and applied according to a position of the point of the scroll bar as shown in FIG. 5C. Once the touch is removed from the scroll bar, the operation is restored on the home screen as shown in FIG. 5D.

According to another embodiment of the present disclosure, an operation part in a desktop or laptop computer may be a setting menu including setting items such as background setting, resolution setting, and so forth or an edit menu for a document, an image, and so forth. An input generated in a first item, which is one or more setting items of the operation window, may include a mouse over, a mouse click, a mouse drag, or the like.

Figure 6A:
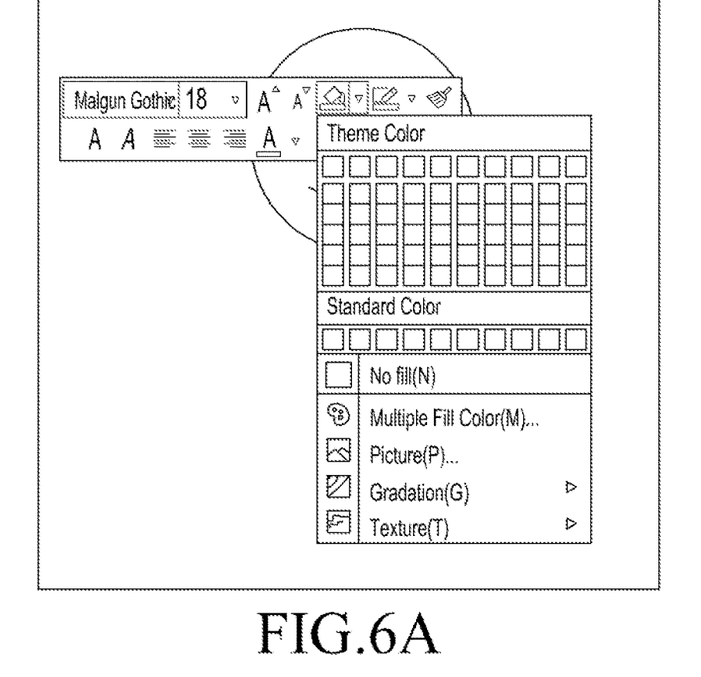
FIGS. 6A and 6B illustrate UI displays corresponding to a mouse input according to an embodiment of the present disclosure.
Figure 6B:
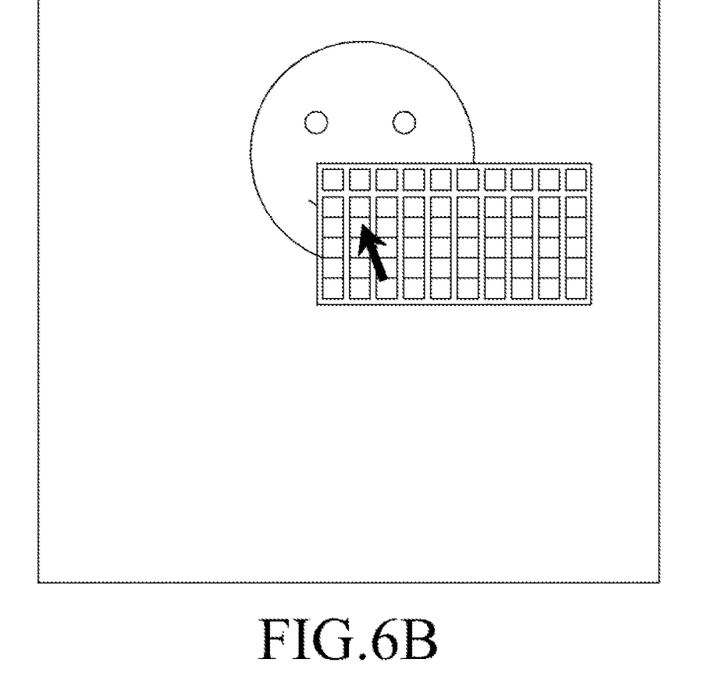

FIGS. 6A and 6B illustrate UI displays corresponding to a mouse input according to an embodiment of the present disclosure.

Referring to FIGS. 6A and 6B, a UI display operation corresponding to a mouse input will be described below. When an operation window is displayed on the screen overlappingly with an image as shown in FIG. 6A, if a mouse over occurs on a theme color item to apply a figure filling effect to the image, the remaining part of the operation window except for the theme color item disappears from the screen as shown in FIG. 6B, displaying only the theme color item on the image. Thereafter, according to the position of the point of the mouse, the color of the image is changed into a color where the mouse over is positioned. When a color is clicked by the mouse, the color is applied to the image and the theme color item disappears from the screen, displaying only the image on the screen.

Figure 7A:
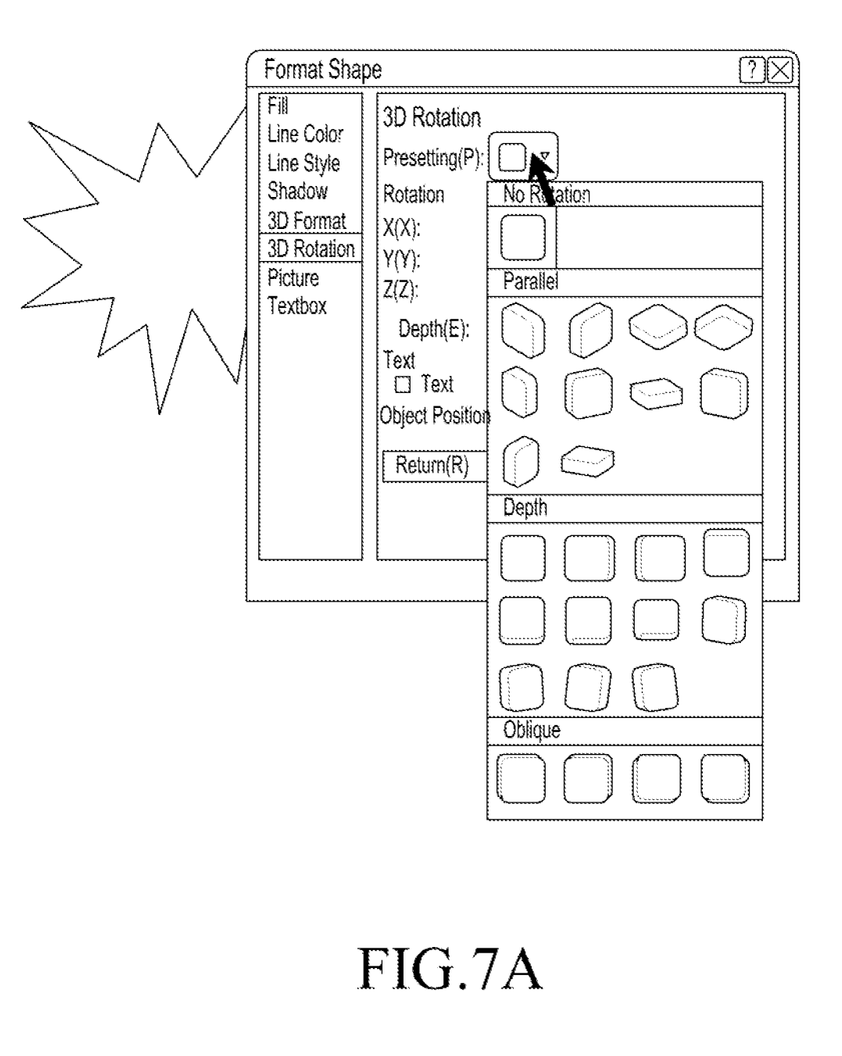
FIGS. 7A and 7B illustrate UI displays corresponding to a mouse input according to another embodiment of the present disclosure.
Figure 7B:
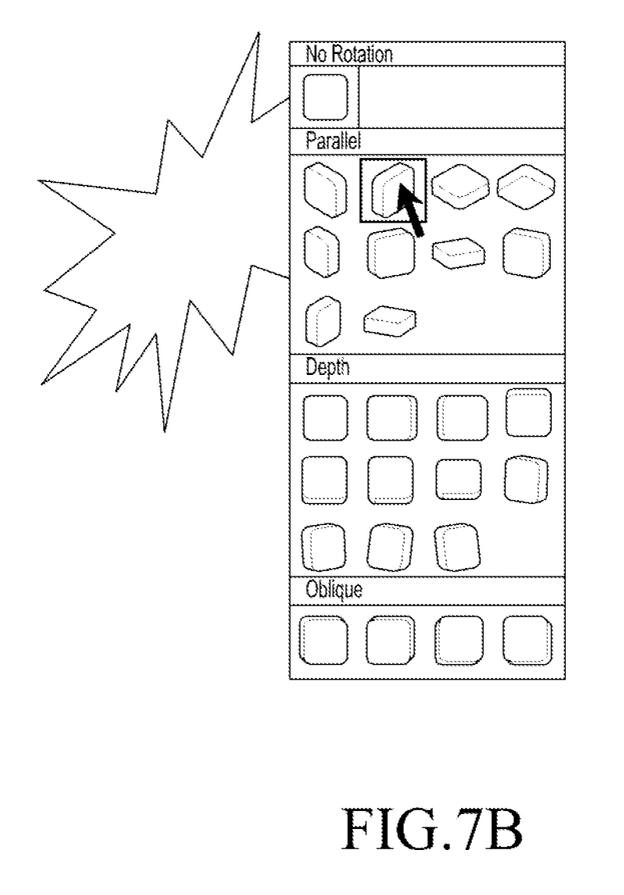

FIGS. 7A and 7B illustrate UI displays corresponding to a mouse input according to another embodiment of the present disclosure.

Referring to FIGS. 7A and 7B, a UI display operation corresponding to a mouse input according to another embodiment of the present disclosure will be described below. When an operation window is displayed on the screen overlappingly with an image as shown in FIG. 7A, if a mouse over occurs on a three-dimensional (3D) rotation item to apply 3D rotation to the image, the remaining part of the operation window except for the 3D rotation item disappears from the screen as shown in FIG. 7B, displaying only the 3D rotation item on the image. Thereafter, according to the position of the mouse over, the image is rotated in a rotation direction of the rotation item where the mouse over is positioned. In this case, if one rotation item is clicked by the mouse, the image is rotated in a rotation direction of the rotation item, and the operation window as shown in FIG. 7A is displayed on the screen again.

Figure 8A:
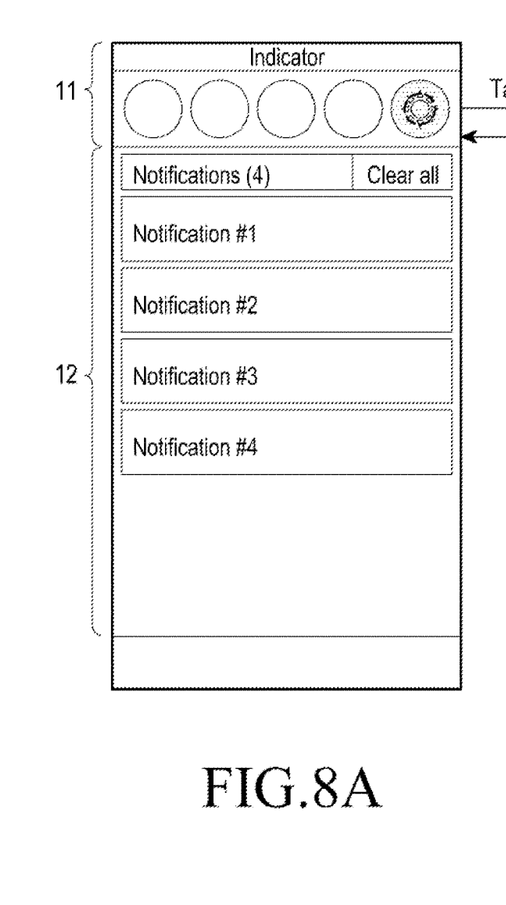
FIGS. 8A, 8B, and 8C illustrate UI displays corresponding to a hand touch according to another embodiment of the present disclosure.
Figure 8B:
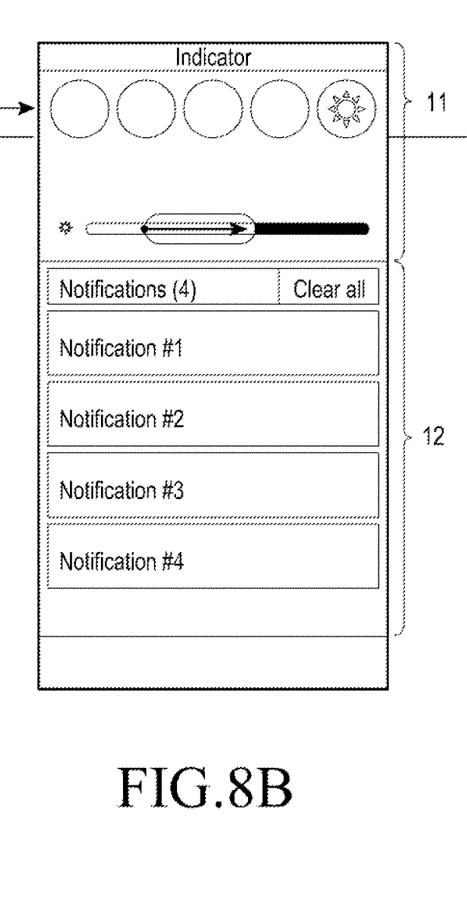
Figure 8C:
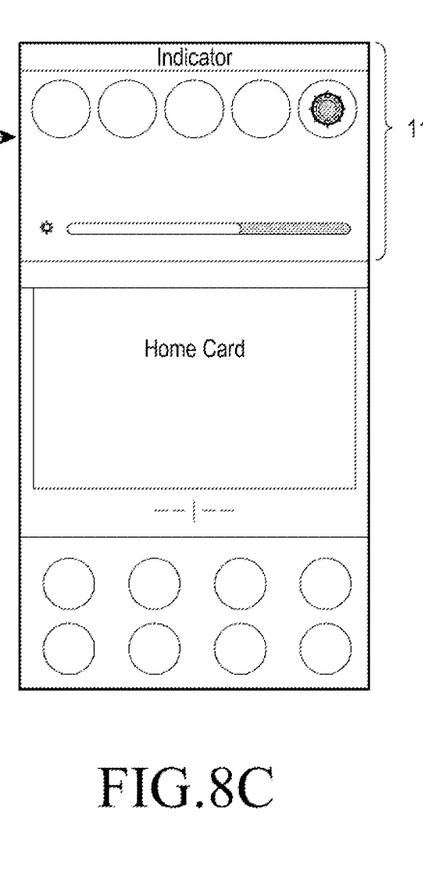

FIGS. 8A to 8C illustrate UI displays corresponding to a hand touch according to another embodiment of the present disclosure.

Referring to FIGS. 8A to 8C, a UI display operation corresponding to a hand touch will be described below. Referring to FIG. 8A to 8C, when a screen including an indicator area 11 and a notification area 12 is displayed on the home screen as shown in FIG. 8A, an item for automatically or manually setting the screen brightness of the portable terminal device (hereinafter, referred to as an auto brightness mode on/off switch) among setting items for changing specific setting of a portable terminal device may be positioned in a preset part of the indicator area 11. The auto brightness mode on/off switch may switch on or off an auto brightness mode by a user input, for example, a sort of touch, a tap (a gesture of shortly and lightly tapping the screen with one finger).

FIG. 8A illustrates a screen on which the auto brightness mode enters an on state, and if the indicator area 11 is displayed on the screen, the auto brightness mode is automatically switched on. If the auto brightness mode is switched on as shown in FIG. 8A, the brightness of the displayed screen may be automatically adjusted to a preset value as shown in FIG. 8A.

When the auto brightness mode is switched on as shown in FIG. 8A, if a tap is input to the auto brightness mode on/off switch, the auto brightness mode may be switched off and a scroll bar for adjusting the screen brightness may be displayed as shown in FIG. 8B. If another tap is input to the auto brightness mode on/off switch in the state shown in FIG. 8B, the screen where the auto brightness mode is in the on state as shown in FIG. 8A may be displayed. Referring to FIG. 8B, to display the scroll bar for a user's manually setting the screen brightness on a preset part under the auto brightness mode on/off switch, the notification area 12 including notification items is moved down and the indicator area 11 including setting items is enlarged to display the scroll bar for manually adjusting the screen brightness in a preset part of the indicator area 11. Thereafter, once the point of the scroll bar is moved in the scroll bar for adjusting the screen brightness by a touch and/or a drag, the remaining part except for the indicator area 11 disappears from the screen as shown in FIG. 8C, thus displaying only the indicator area 11 including the setting items and the scroll bar for adjusting the screen brightness on the screen to adjust the brightness of the screen. If a tap is further input onto the auto brightness mode on/off switch on the screen as shown in FIG. 8C, the screen as shown in FIG. 8A may be displayed on the screen again.

For a portable terminal device including a temperature measurement module for measuring the temperature of the portable terminal device, screen brightness adjustment may be limited according to the temperature of the portable terminal device. For example, if the temperature of the portable terminal device is between about 25° C. and 44° C., a maximum brightness adjustable value may be set to 300 cd, and if the temperature of the portable terminal device is higher than 54° C., a maximum brightness adjustable value may be set to 40 cd. According to such setting, if there is a user input for adjusting the brightness of the screen over a maximum brightness adjustable value set to corresponding to a particular temperature at the particular temperature in the portable terminal device, adjustment over the maximum brightness adjustable value may be limited. In addition, for example, a message indicating that further brightness adjustment is not possible due to a high temperature of the portable terminal device may be displayed on the screen to inform the user of such a situation.

Figure 9A:
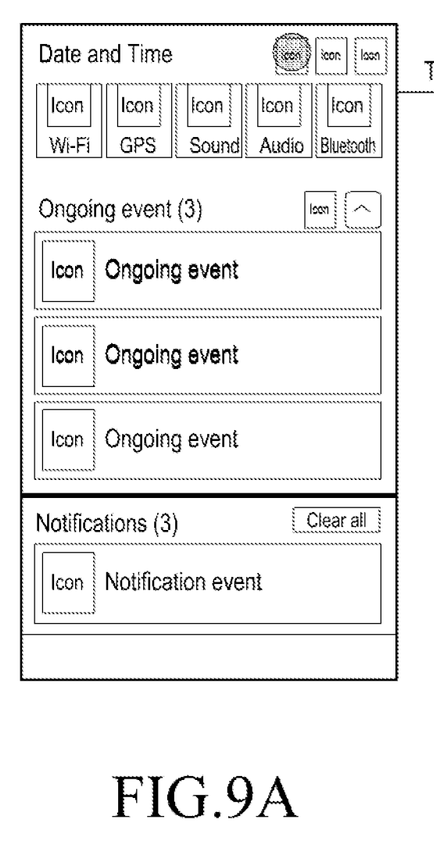
FIGS. 9A and 9B illustrate UI displays corresponding to a hand touch according to another embodiment of the present disclosure.
Figure 9B:
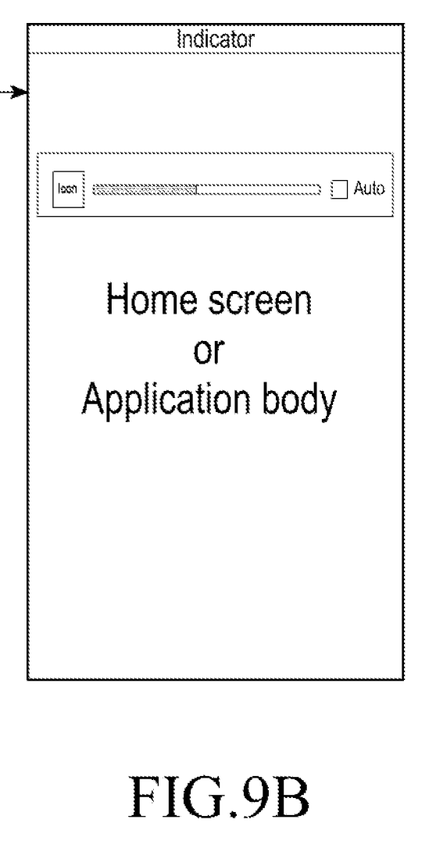

FIGS. 9A and 9B illustrate UI displays corresponding to a hand touch according to another embodiment of the present disclosure.

Referring to FIGS. 9A and 9B, when an operation window as shown in FIG. 9A is displayed on a home screen (or a screen where another specific application is executed), upon input of a tap, which is a sort of touch, to a brightness setting icon for manually setting the brightness of the screen, then a scroll bar for adjusting the brightness of the screen may be displayed on the screen as shown in FIG. 9B. In this state, the remaining part except for the scroll bar disappears, thus displaying only the scroll bar on the home screen (or the screen where another specific application is executed). Also, to automatically adjust the brightness of the screen, a checkbox for selecting Auto may be displayed at a side of the scroll bar, and upon input of a tap on the checkbox, the screen as shown in FIG. 9A may be displayed.

The structures and operations of the UI display method and apparatus according to an embodiment of the present disclosure may be made as described above, and while embodiments have been described in the foregoing description of the present disclosure, other various embodiments of the present disclosure, various modifications, and changes may be made. For example, all or some of the respective operations described in the present specification may be simultaneously performed in parallel, may be skipped, or may include other additional operations.

For example, in the foregoing embodiment, if it is determined that an input is generated on a first item of an operation window, the remaining part of the operation window except for the first item is not displayed on the screen, but at least a part of the operation window except for the first item may be additionally displayed.

Moreover, if an input is generated on a first item among one or more setting items of an operation window displayed on the screen, the remaining part of the operation window displayed on the screen except for the first item may be displayed semi-transparently.

Also, in the aforementioned embodiment, if it is determined that the input is generated on the first item of the operation window, the remaining part of the operation window except for the first item is not displayed and a position where the first item is displayed is not changed. However, if it is determined that the input is generated on the first item of the operation window, the remaining part of the operation window except for the first item may not be displayed on the screen and the display position of the first item may be automatically changed.

It can be seen that the embodiments of the present disclosure may be implemented with hardware, software, or a combination of hardware and software. Such arbitrary software may be stored, whether or not erasable or re-recordable, in a volatile or non-volatile storage such as a ROM, a memory such as a RAM, a memory chip, a device, or an integrated circuit, and an optically or magnetically recordable and machine (e.g., computer)-readable storage medium such as a compact disc (CD), a digital versatile disc (DVD), a magnetic disk, or a magnetic tape. It can be seen that a memory that may be included in the portable terminal device is an example of a machine-readable storage medium which is suitable for storing a program or programs including instructions for implementing the embodiments of the present disclosure. Therefore, the present disclosure includes a program including codes for implementing an apparatus or method claimed in an arbitrary claim and a machine-readable storage medium for storing such a program. The program may be electronically transferred through an arbitrary medium such as a communication signal delivered through wired or wireless connection, and the present disclosure properly includes equivalents thereof.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. An electronic apparatus comprising:
   a touch display;
   at least one processor; and
   memory storing a program including instructions that, when executed by the at least one processor, cause the electronic apparatus to:
   control the touch display to display a first screen,
   while displaying the first screen, identify an input for displaying an operation window,
   based on identifying the input, control the touch display to display the operation window on at least part of the first screen, wherein the operation window comprises at least one icon and a brightness adjusting area comprising a scroll bar and an indicator indicating a point on the scroll bar, wherein a brightness of the touch display corresponds to the point on the scroll bar which is indicated by the indicator,
   while displaying the operation window on the at least part of the first screen, identify a touch drag input corresponding to the brightness adjusting area,
   adjust the brightness of the touch display based on the touch drag input, wherein a part of the operation window is not displayed so that a portion of the first screen underneath the part of the operation window is visible together with the brightness adjusting area while the brightness of the touch display is adjusted, wherein a position of the point indicated by the indicator is changed according to the touch drag input,
   while displaying the portion of the first screen underneath the part of the operation window with the brightness adjusting area, identify a release of the touch drag input, and
   based on identifying the release of the touch drag input, control the touch display to display the operation window by displaying the part of the operation window over the portion of the first screen.

2. The electronic apparatus of claim 1, wherein the instructions, when executed by the at least one processor, cause the electronic apparatus to:
   adjust the brightness of the touch display according to change of the position of the point on the scroll bar which is indicated by the indicator as at least part of adjusting the brightness of the touch display.

3. The electronic apparatus of claim 1, wherein the touch drag input comprises a continuous movement of a touch on the touch display without release of the touch.

4. The electronic apparatus of claim 1, wherein the input is a user's pull-down operation on the touch display.

5. The electronic apparatus of claim 1, the instructions, when executed by the at least one processor, cause the electronic apparatus to:
display, on the touch display, the part of the operation window together with the brightness adjusting area, so that the operation window is restored as at least part of displaying the operation window by displaying the part of the operation window over the portion of the first screen.

6. The electronic apparatus of claim 1, wherein the operation window is displayed to occupy all or a portion of a display area of the touch display.

7. A user interface (UI) display method comprising:
displaying, on a touch display of an electronic apparatus, a first screen;
while displaying the first screen, identifying an input for displaying an operation window;
based on identifying the input, displaying, on the touch display, the operation window on at least part of the first screen, wherein the operation window comprises at least one icon and a brightness adjusting area comprising a scroll bar and an indicator indicating a point on the scroll bar, wherein a brightness of the touch display corresponds to the point on the scroll bar which is indicated by the indicator;
while displaying the operation window on the at least part of the first screen, identifying a touch drag input corresponding to the brightness adjusting area;
adjusting the brightness of the touch display based on the touch drag input, wherein a part of the operation window is not displayed so that a portion of the first screen underneath the part of the operation window is visible together with the brightness adjusting area while the brightness of the touch display is adjusted, wherein a position of the point indicated by the indicator is changed according to the touch drag input;
while displaying the portion of the first screen underneath the part of the operation window with the brightness adjusting area, identifying a release of the touch drag input; and
based on identifying the release of the touch drag input, displaying, on the touch display, the operation window by displaying the part of the operation window over the portion of the first screen.

8. The UI display method of claim 7, wherein the adjusting of the brightness of the touch display comprises:
adjusting the brightness of the touch display according to change of the position of the point on the scroll bar which is indicated by the indicator.

9. The UI display method of claim 7, wherein the touch drag input comprises a continuous movement of a touch on the touch display without release of the touch.

10. The UI display method of claim 7, wherein the displaying of the operation window by displaying the part of the operation window over the portion of the first screen comprises:
displaying, on the touch display, the part of the operation window together with the brightness adjusting area, so that the operation window is restored.

11. The UI display method of claim 7, wherein the operation window is displayed to occupy all or a portion of a display area of the touch display.

* * * * *